United States Patent [19]
Peuschel et al.

[11] 3,716,333
[45] Feb. 13, 1973

[54] PROCESS OF AND APPARATUS FOR THERMOMETRIC ANALYSIS

[75] Inventors: Gerd Peuschel, 3163 Sehnde; Fritz Hagedorn, 3001 Bolzum ueber Han., both of Germany

[73] Assignee: Kali-Chemie A. G., Hannover, Germany

[22] Filed: Dec. 4, 1970

[21] Appl. No.: 95,153

[30] Foreign Application Priority Data

Dec. 9, 1969 Germany..................P 19 61 633.2

[52] U.S. Cl...................23/230 R, 23/253 R, 73/15, 73/190
[51] Int. Cl.............................................G01n 25/48
[58] Field of Search.....23/230 A, 253 A, 259; 73/15, 73/190

[56] References Cited

UNITED STATES PATENTS

| | | | |
|---|---|---|---|
| 3,160,477 | 12/1964 | Wasilewski | 23/253 |
| 3,276,843 | 10/1966 | Cooper, Jr. | 23/230 |

OTHER PUBLICATIONS

Zenchelsky, "Thermometric Titration," Analytical Chemistry, Vol. 32, No. 5, April 1960, pp 289R–291R.

*Primary Examiner*—Morris O. Wolk
*Assistant Examiner*—R. E. Serwin
*Attorney*—Michael S. Striker

[57] ABSTRACT

Process and apparatus for thermometric analysis in which a pump supplies a test solution containing a component, the concentration of which is to be determined, and a reagent solution, adapted to react with the component, to a reaction vessel containing a stirrer and a temperature sensor. The solutions are fed at controlled, constant rates to the reaction vessel through tubing immersed in a constant temperature bath, and the reaction vessel, consisting of a material having a relatively low thermal conductivity, is also immersed in the bath. The temperature in the reaction vessel on mixing the solutions is noted and compared with calibration data.

14 Claims, 2 Drawing Figures

3,716,333

PROCESS OF AND APPARATUS FOR THERMOMETRIC ANALYSIS

BACKGROUND OF THE INVENTION

Methods of analysis, in which the measurement of a temperature change resulting from a chemical reaction have been used to estimate the content of an ingredient have been known for a long time. A variety of methods has been used for this purpose, such as, for example, titration with thermometric determination of the end point or the addition of a reagent solution in excess and measuring of the temperature before and after the reaction. Physical effects have also been used in this way where the temperature change is due to heat of dilution. For complete detection of the temperature change and for elimination of outside vessels it has been the practice to operate in Dewar vessels or in vessels made of thermally insulated synthetic resins. Fundamentally, the objective was to avoid heat exchange with the surroundings.

The novel features which are considered as characteristic for the invention are set forth in particular in the appended claims. The invention itself, however, both as to its construction and its method of operation, together with additional objects and advantages thereof, will be best understood from the following description of the specific embodiments when read in connection with the accompanying drawings.

DESCRIPTION OF THE PREFERRED EMBODIMENTS

Figure 1:
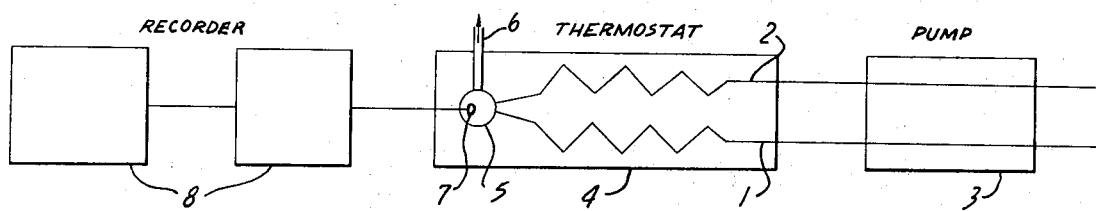
FIG. 1 is a schematic diagram showing the means for bringing the test solution and the reagent solution to the reaction vessel and recording equipment for measuring and recording the temperature change resulting.

By means of the present invention it is possible on the basis of thermometry, to carry out large series of analyses automatically and with a high frequency of testing. In addition, the invention is adapted for continuous monitoring and regulation of manufacturing processes. FIG. 1 shows the stream of the test solution 1 as well as the reagent stream 2 which is generally supplied in excess by means of a dosing pump 3 through a constant-temperature bath 4 to a reaction vessel 5 which is also immersed in the bath. The reaction between the two streams takes place in the reaction vessel. The reaction mixture is removed from the vessel through the effluent tube 6. The temperature change in the cell depends on the concentration of the component to be estimated. The temperature change is measured with a suitable sensor 7 and recorded by the recorder 8. In accordance with the present invention, it is possible to measure both the temperature of the bath and the temperature in the cell. However, it is preferable to hold the bath temperature constant, at which point it becomes necessary only to measure the temperature in the cell.

A characteristic of the present invention which contrasts with the conventional processes is that the reaction vessel is in heat exchange with the constant temperature bath. As a result, the following advantages are derived: 1. the effect of room or ambient temperature on the reaction vessel is eliminated by means of the constant temperature bath. 2. As a result of introducing the test and reagent solutions likewise through the bath, the two solutions enter the reaction vessel at equal, and constant temperature. As a result of introducing the two solutions in a constant ratio, the determination becomes very simple since the temperature change in the cell is dependent only on changes in concentration of the component whose concentration is to be determined. The temperature change is measured by means of a sensor and, by means of a combination of measuring equipment and recorder, is recorded and compared with previously derived calibration data. The previously derived calibration data may be expressed in terms of characteristic curve.

The advantages of the method become especially clear, when one considers that in the absence of the thermostatic bath it would be necessary to measure three different temperatures, namely, the test and reagent solution temperatures and that of the reaction mixture. In addition, a relatively complex calculation operation would be necessary to correlate the temperatures of the solutions and the reaction vessel with the quantity of the substance to be determined in the feed solution. Using the present invention, where the bath temperature is held constant, only one temperature measurement is necessary. This is achieved in very simple fashion by using a constant temperature bath of sufficiently great volume. In the Examples given below, two constant temperature baths in series were utilized to bring the reagent stream and the test stream to the desired temperature. The temperature of the water bath varied by less than ± 0.01°C. As is obvious, one constant temperature bath of sufficient size would be adequate for this purpose, the principal requirement being that a sufficient area of tubing immersed in the bath be provided so that the streams are completely equilibrated at the temperature of the bath. For the same reason, the material of which the tubing is composed should, preferably, have a high thermal conductivity. Metals such as copper, steel, nickel and silver meet this requirement.

3. The reaction vessel employed in accordance with the invention is preferably made of a material with a relatively low thermal conductivity, such as glass, or synthetic resin. The reason is that if the thermal conductivity were high, the heat developed during the reaction would be rapidly dissipated through the walls to the constant temperature bath and the measured temperature change within the vessel would be too low. Under the stated conditions, it is convenient that the heat exchange with the bath is such that the equilibrium temperature in the cell is quickly attained. This is necessary so that analysis for the desired component can be carried out with sufficiently high frequency. This is particularly important, if the component to be determined is present in very high concentration so that the analysis has to be carried out in a broad range of percentages. When carrying out the operation according to this method, a base-line is present which corresponds to the region of the lower level of concentration and peaks are recorded. This results in an alternation between the base solution and the test solution and thereby a relatively high change in temperature in the vessel. In the absence of the bath it will be necessary that the measuring vessel have a high heat capacity in order to screen out outside influences. The temperature equilibrium on the basis of the permanent output and loss of heat through the cell would take too long to be established, especially since the thermal conductivity of the vessel material must naturally not be too great.

A further important characteristics of the present invention lies in the structure of the reaction vessel. The vessel is completely sealed and is constructed of a material with a relatively low thermal conductivity and fitted with at least two inlets for the test and reagent solutions and with an exit tube for the reaction mixture. A sensor projects into the vessel for the measurement of temperature, said sensor preferably being a thermistor; the vessel also contains a high speed stirrer. Preferably, a magnetic stirrer is used, where the drive for the stirrer is located below the constant temperature bath. In general it is desirable that the volume of the reaction cell lie between 0.5 and 5 ml., though definite limits must not be applied to the value. The cells used in the examples which follow has a content of 1 ml.

Figure 2:
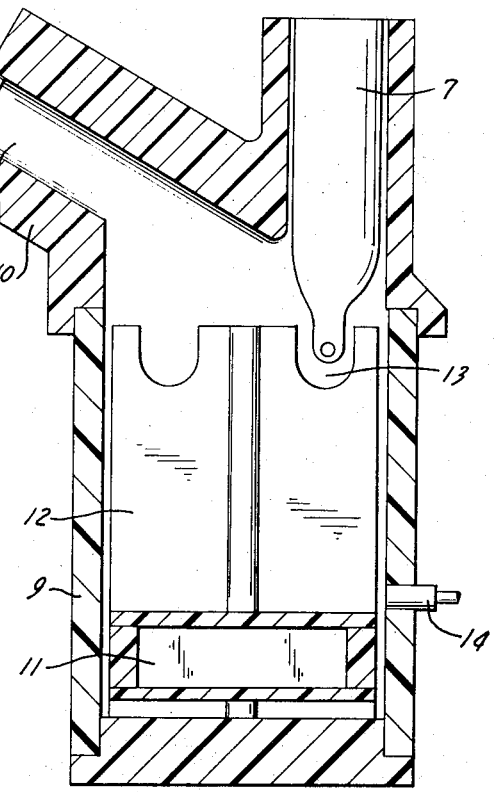
FIG. 2 is an elevation in cross-section showing the reaction vessel and its various fittings.

The indispensible thorough and rapid mixing of the solutions is guaranteed by means of intensive stirring. In addition, the shape of the vessel is such that settling of a precipitate or stoppage as a result of precipitation are avoided. Without such stirring, the mixture of the solutions is incomplete and there is danger of formation of deposits and plugging so that reliable measurements of temperature according to the experimental design presented is not possible. FIG. 2 shows in elevation a reaction vessel suitable for a precipitation reaction, the scale being 5:1. The walls of the lower cylindrical portion 9 and the bottom consist of friction resistant Teflon. The material of the cover 10 is Plexiglas which makes it possible to observe the interior of the vessel. The cell contains a Teflon stirrer consisting of a circular disk 11 in which a bar magnet is embedded, and four stirrer vanes 12 placed at right angles to each other, which provide intensive mixing of the entire volume of the cell. The stirrer vanes contain indentations 13 into which the temperature sensor 7 projects so that in a precipitation reaction the temperature sensor is maintained free of deposits. The test and related solutions are introduced through at least two tubes 14 into the lower part of the cell. The solution inlets may, if desired, be distributed around the periphery of the vessel, either near each other or at positions separated by 180°. The reaction mixture leaves the vessel through the outlet 6 which is connected with the pipe 15.

It is to be understood that the form and the material of the described reaction vessel had been given merely as an example. Reaction vessels of other types made of other materials may also be employed.

When the substance whose concentration is to be determined is present in high concentrations relative to other components and when the method of analysis involves a precipitation reaction, then it is essential that difficulties due to the presence of large quantities of solids be overcome. In this case, only relative small errors in the usual tolerance of the analysis are permitted, the precision requirements of the analysis will therefore be relatively high. This can be the case only if the temperature change is as great as possible, which again makes it necessary to use high concentrations in the test and reagent streams which will cause the production of large quantities of precipitate. Any dilution used to overcome the effect of the solid suspension reduces the temperature change and thereby the sensitivity of the method. In addition, disturbances from outside influences such as the unavoidable oscillations of the temperature of the constant temperature bath—independent of the temperature change in the reaction vessel—remain approximately constant in size. The errors produced by these disturbances are approximately inversely proportional to the change in quantity per unit of volume or to the concentrations of the test and reagent solutions.

In accordance with the process described above, quantitative determination of a component can be effected by means of a heat effect such as a heat of reaction which is associated with a sufficiently rapid chemical or physical-chemical process. By this method, neutralization and dilution heat effects as well as the generally large heat of reaction of a redox process can be used. Likewise it is possible to carry out the process on the basis of the heat effect of a precipitation reaction. It is especially favorable for carrying out the desired process that suspensions having a high solids content can be pumped through the vessel.

It is obvious that thermometric analysis in accordance with the present invention can easily be rendered automatic. This arrangement leads to a substantial saving in time and labor.

A further advantage of the process is to be seen in the fact that it is particularly suitable for analyses of compositions where the content of the component whose concentration is to be determined lies in the middle or high percentages. Other methods of physical analyses such as flame photometry and colorimetry which are suitable for automatic analytical techniques, are frequently unsuitable for use at those concentration levels.

A further factor in rendering the present process suitable for a wide range of uses is the face that extensive series of individual analyses can be carried out—such as use in combination with commercial sample changers—as well as in monitoring continuous test streams. This last is an importance in the automatic monitoring and regulation of processes.

EXAMPLE I

The precipitation of potassium according to the equation $K^+ + ClO_4^- = KClO_4$ is associated with a substantial positive heat of reaction, which makes it possible to effect a quantitive determination of the element in accordance with the present process.

By means of a hose-dosing pump, 2.1 ml./min. of test solution (about 12 g of potassium salt per 100 ml. of solution) and 1.6 ml./min. $NaClO_4$—solution (50 g $NaClO_4$ per 100 ml. of solution) were pumped through suitable glass spirals immersed in a constant temperature water bath (23° ± 0.01°C.) and united in a Plexiglas reaction vessel, also located in the same constant temperature bath. Mixing in the cell was carried out by means of a Teflon stirrer with a bar magnet set therein, the stirrer being rotated 1,500 revolutions per minute by means of a magnetic stirrer located beneath the constant temperature bath.

The difference in temperature generated between the interior of the reaction vessel and the temperature of the bath is proportional to the potassium content. Since the bath temperature is kept constant, it is only necessary that the temperature change in the cell be noted, preferably by means of a thermistor, the electrical resistance of which is dependent on temperature, and to measure the temperature change by means of a modified wheatstone. bridge, the temperature being recorded by means of a recorder.

To determine the actual content of the component, the temperature change is compared with calibration data obtained by measuring the temperature change resulting from solutions of known concentrations. The process described was used for the determination of the potassium content in a solution containing a high percentage of potassium fertilizer salts. The tests were made of a frequency of 30/h. The reproducibility of the analytical results was extraordinarily good. The error amounted to ± 02.%$K_2O$ absolute with a statistical realiability of 95 percent. Systematic deviations were not found.

It was recognized that glass, of which the spirals were made, does not have a high thermal conductivity. However, the area of the spirals was large and the temperature change involved in the equilibration was small. Consequently glass could serve as the material for the spirals. Glass is particularly suitable for such use since it is relatively inert and could not contaminate the solutions which were put through it.

EXAMPLE II

In the manufacture of potassium by the hot solution process the degree of saturation of the solution is of great importance with respect to optimization of processes.

For control purposes, a continuous stream of about 230 g KCl per liter containing solution was pumped from a downstream clarifier by means of a hose pump and diluted 1:1 with water. The solution obtained in this way corresponded in its KCl content with the test solution of Example I. It was introduced into the analysis apparatus in a continuous stream of 2.1 ml./min. and analyzed as in Example I. By means of the diagram recorded on the recorder, it is possible to effect regulation of the degree of saturation of the potassium salt or the introduction of lye in the lixivation, apparatus.

EXAMPLE III

The quantitative estimation of magnesium is carried out in known way by addition of ammonium dihydrogen phosphate to an ammonia alkaline solution of magnesium slats and precipitation of ammonium magnesium phosphate. The course of the reaction is associated with a substantial positive heat of reaction so that an automatic thermometric estimation of magnesium in analogy with Example I can be carried out by introducing into the measuring cell thermostated streams of an ammonia alkaline solution of magnesium salt and ammonium or alkaline dihydrogen phosphate solution. The working out of the recorded measured values is effected with the help of characteristic calibration curves.

These methods can be used with advantage for the determination of magnesium in high percentage magnesium salts and for the continuous testing of brines such as in the preparation of potassium sulfate and in other processes where the rapid determination of magnesium content in solutions is of importance.

As a reciprocal method of analysis, the ammonium magnesium phosphate precipitation can be used in a similar way for the determination of phosphates, by bringing together solutions of the phosphate to be determined and a magnesia solution.

The magnesia solution is prepared as follows: 5 g $MgCl_2 \cdot 6 H_2O$ and 10 g $NH_4Cl$ are dissolved in 65 ml. of water and brought to 100 ml. with concentrated ammonia solution (CH.W. Biltz, Processes of Quantitative Analyses, Seventh edition, 1955, pages 89 and 90).

The use of the new process is not be considered limited in any way by the examples presented herewith. It can be used for analytical purposes wherever there are reactions which involve heat effects, which depend on the content of the substance to be determined in the test or in the test stream.

Without further analysis, the forgoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A process for effecting a thermometric analysis comprising the steps of feeding a test solution through tubing located in a thermostatically controlled bath into a reaction vessel; feeding the reagent solution through separate tubing located in the same thermostatically controlled bath into said reaction vessel, the reagent solution adapted to react, upon mixing, with at least one component of said test solution while causing a temperature change to take place as a result of said reaction, the said test solution and reagent solution entering the reaction vessel at a constant ratio and at an equal and constant temperature and the said reaction vessel being in heat exchange relationship with said bath; mixing said solutions to produce said temperature change by reaction of said reagent solution with said test solution; and measuring said temperature change in said reaction vessel and bath, said temperature change being an indicator of a characteristic of said reaction taking place in said reaction vessel.

2. The process of claim 1 wherein the said bath is maintained at a constant temperature and the temperature change is measured in said reaction vessel.

3. Process as defined in claim 1, wherein said tubing is composed of a material of high thermal conductivity and said vessel is composed of a material of lower thermal conductivity, allowing a more limited exchange of heat.

4. Process as defined in claim 1, wherein said tubing is composed of a metal and is sufficiently long so that the temperature of said solutions on reaching said reaction vessel is essentially equal to the temperature of said bath, and said reaction vessel is composed of a material selected from the group consisting of glass and plastics.

5. Process as defined in claim 1, wherein said temperature change is compared with data derived in the calibration of said process, thereby determining the value of said characteristic of said reacting component of said test solution.

6. Process as defined in claim 5 wherein said comparison is carried out automatically, and said data are in the form of a calibration curve.

7. Process as defined in claim 1 wherein said test solution and said reagent solution are fed continuously to said reaction vessel.

8. Process as defined in claim 1 wherein said reagent solution is fed continuously to said reaction vessel and said test solution is automatically fed discontinuously to said reaction vessel.

9. Process as defined in claim 1 wherein said reaction between said reagent solution and said test solution produces a precipitate and the resulting temperature change is determined.

10. Process as defined in claim 1 wherein said reagent solution and said test solution are highly concentrated.

11. Process as defined in claim 1 wherein the concentration of potassium in a test solution is determined by feeding said test solution containing a potassium salt, and a reagent solution containing sodium perchlorate to said reaction vessel.

12. Process as defined in claim 1 wherein the concentration of magnesium in a test solution is determined by feeding said test solution made alkaline with ammonia and containing a magnesium salt, and said reagent solution containing a salt selected from the group consisting of ammonium dihydrogen phosphate and sodium dihydrogen phosphate to said reaction vessel.

13. Process as defined in claim 1 for determining the phosphate content of a test solution by feeding a phosphate-containing test solution and a reagent solution made alkaline with ammonia and containing a magnesium compound to said reaction vessel.

14. Apparatus for automatic thermometric analysis, comprising a reaction vessel; means for intensive mixing within said vessel; a probe for determining temperature within said vessel; automatic means for comparing said temperature with previously derived calibration data; means for introducing at least one test solution to said reaction vessel; means for introducing at least one reagent solution to said vessel; means for fast removal of said solutions and precipitates from said reaction vessel subsequent to mixing in said reaCtion vessel; a constant-temperature bath in which said reaction vessel which allows a limited exchange of heat with the bath is completely immersed and in which said test and reagent solutions are at least partially immersed; and pumping means for feeding said test and reagent solutions to said reagent vessel.

* * * * *